(12) United States Patent
Dahl (10) Patent No.: US 6,199,892 B1
(45) Date of Patent: Mar. 13, 2001

(54) CONVERTIBLE COVER ASSEMBLY FOR RECEIVER HITCH

(76) Inventor: James E. Dahl, 1069 S. Sterling St., Maplewood, MN (US) 55119

( * ) Notice: Subject to any disclaimer, the term of this patent is extended or adjusted under 35 U.S.C. 154(b) by 0 days.

(21) Appl. No.: 09/385,191

(22) Filed: Aug. 30, 1999

Related U.S. Application Data (60) Provisional application No. 60/098,768, filed on Sep. 1, 1998.

(51) Int. Cl.[7] .......................................... B60D 1/60
(52) U.S. Cl. ............................ 280/507; 280/292
(58) Field of Search ......................... 280/292, 507; 40/591; 138/89; D12/162

(56) References Cited

U.S. PATENT DOCUMENTS

| | | | |
|---|---|---|---|
| 4,040,641 | * | 8/1977 | Riecke ................................ 280/507 |
| 4,852,902 | * | 8/1989 | Young et al. ........................ 280/507 |
| 5,603,178 | * | 2/1997 | Morrison ............................. 40/591 |
| 5,879,102 | * | 3/1999 | Koliopoulos .................... 403/374.1 |
| 6,019,386 | * | 2/2000 | Morelock ............................ 280/507 |
| 6,079,136 | * | 6/2000 | Kozlarek ............................. 40/541 |

OTHER PUBLICATIONS

Advertisement: Advertising That Lasts—Polished Stainless Hitch Covers by Giant A&M.
Advertisement: HitchHider™ Trailer Hitch Protector.

* cited by examiner

Primary Examiner—J. J. Swann
Assistant Examiner—Michael Cuff
(74) Attorney, Agent, or Firm—Faegre & Benson LLP (57) ABSTRACT

Convertible receiver hitch cover that fits at least first and second receiver tubes having respective first and second bores of respective first and second cross-sections. The cover includes a faceplate having a periphery, a front side and a backside. A shaft extends from the backside of the faceplate, wherein the shaft has a first end proximal to the faceplate and a second end distal from the faceplate. The shaft has a cross-section corresponding to the cross-section of the first bore of the first receiver tube. A removable spacer is adapted to fit over the shaft and has a cross-section corresponding to the cross-section of the second bore of the second receiver tube.

6 Claims, 9 Drawing Sheets

CONVERTIBLE COVER ASSEMBLY FOR RECEIVER HITCH

This application claims the benefit of priority from U.S. Provisional Application No. 60/098,768 filed Sep. 1, 1998, incorporated herein by reference in its entirety.

FIELD OF THE INVENTION

The present invention relates to a receiver hitch cover that includes an adapter allowing the cover to fit into more than one size receiver hitch tube. More specifically, the invention relates to a receiver hitch cover having a removable sleeve or spacer element that can be placed onto the cover so that the cover fits one size of receiver tube, or that can be removed so that the cover fits another size of receiver tube.

The present invention also relates to an approach for applying a protective covering over graphic elements that may be printed, adhered or otherwise positioned on the cover assembly. More specifically, a protective coating is formed from a fluid polymer that expands as it cures to form a clear, abrasion resistant, water resistant covering over the graphic information.

BACKGROUND OF THE INVENTION

A receiver hitch cover is used to cover an automobile's Class II or Class III receiver hitch tube when the towing drawbar is not in place. A hitch cover improves the aesthetics of the hitch tube covering the unsightly empty, and typically rusty, hitch tube. The cover also protects the tube from debris, dirt, etc. that might enter the tube from the rear of the vehicle. Often, covers include information in the form of graphics and/or text to further enhance aesthetics. For example, logos, clever slogans, graphics depicting special interests, and the like are often printed onto the cover, applied as a decal, or otherwise affixed to the cover.

The graphics and text information applied onto the cover is susceptible to damage from the elements as well as dirt and debris that can strike the cover with some force when a vehicle carrying the cover is driving down the roadway. Salt, ice, harsh weather, and the sun, in particular, can degrade the quality of the graphics and text in a relatively short time. Therefore, it is desirable to provide a clear, abrasion resistant, weather resistant, ultraviolet light resistant protective coating over the information. However, providing a protective coating that has all of these desirable properties has been challenging. Many conventional protective coating materials degrade in sunlight. Others are not sufficiently waterproof. Still others do not adhere well to the cover. Another problem concerns excessive expansion and contraction with seasonal temperature changes. Too much expansion and contraction can cause the protective coating to crack.

The respective sizes of the Class II and Class III hitch tubes are specified by industry standards and are different from each other. The Class II receiver hitch tube is generally square-shaped, with the tube being about 1¼ inches square. The Class III receiver hitch is also square-shaped, but is a little bigger. Its tube is about 2 inches square.

Manufacturers of receiver hitch covers previously made two different sized covers to fit the Class II and III hitches, respectively. This requires the manufacturers to establish and run separate manufacturing lines for each cover, separate packaging designs, separate inventory tracking systems, and the like. This double investment is costly and inefficient. It would be desirable to find a way to make a hitch cover that would fit both Class II and Class III hitches to avoid such duplication. The manufacturer would benefit directly from reduced manufacturing and distribution costs, and these cost savings could be passed onto the consumer.

SUMMARY OF THE INVENTION

The present invention provides a convertible receiver hitch cover that is easily modified on demand to fit into two or more different sized receiver hitch tubes. The convertible hitch cover generally includes a faceplate and a stem extending from the faceplate that can be inserted into a hitch tube. A sleeve or a spacer element is selectively positioned over the stem so that the cover fits into a correspondingly sized hitch tube. When the sleeve or spacer element is removed, the cover fits into a smaller sized tube. Different sized spacers can be used so that the cover can fit into many differently sized tubes.

In another aspect, the present invention includes a faceplate having a lip around the front face to define a cavity in which graphic or text elements may be placed. The cavity may then be at least partially filled with a protective coating that overlies the graphic or text elements. Preferably, the coating is formed from one or more ingredients comprising a thermosetting polymer that undergoes no shrinkage, and preferably expands slightly, as it cures. Because the polymer does not shrink as it cures, the polymer fills and interlocks with microscopic voids on the faceplate, thus helping to mechanically secure the protective coating to the faceplate.

In another aspect, the present invention involves forming the protective coating from a poured, thermosetting, non-shrinking polymer in which air bubbles in the poured polymer may be expelled by contacting the surface of the poured polymer with carbon dioxide.

DETAILED DESCRIPTION

FIGS. 1 to 9 illustrate one embodiment of a convertible receiver hitch cover 10 of the present invention. Cover 10 generally includes faceplate 11 having periphery 12, front face 13, and backside 14. As shown for purposes of illustration, periphery 12 of cover 10 is generally octagonal shaped. Of course, the shape of periphery 12 is not limited to being octagonal, but can be any desired shape, such as square, rectangular, oval, pentagonal, trapezoidal, concave, convex, hexagonal, triangular, or the like.

Figure 1:
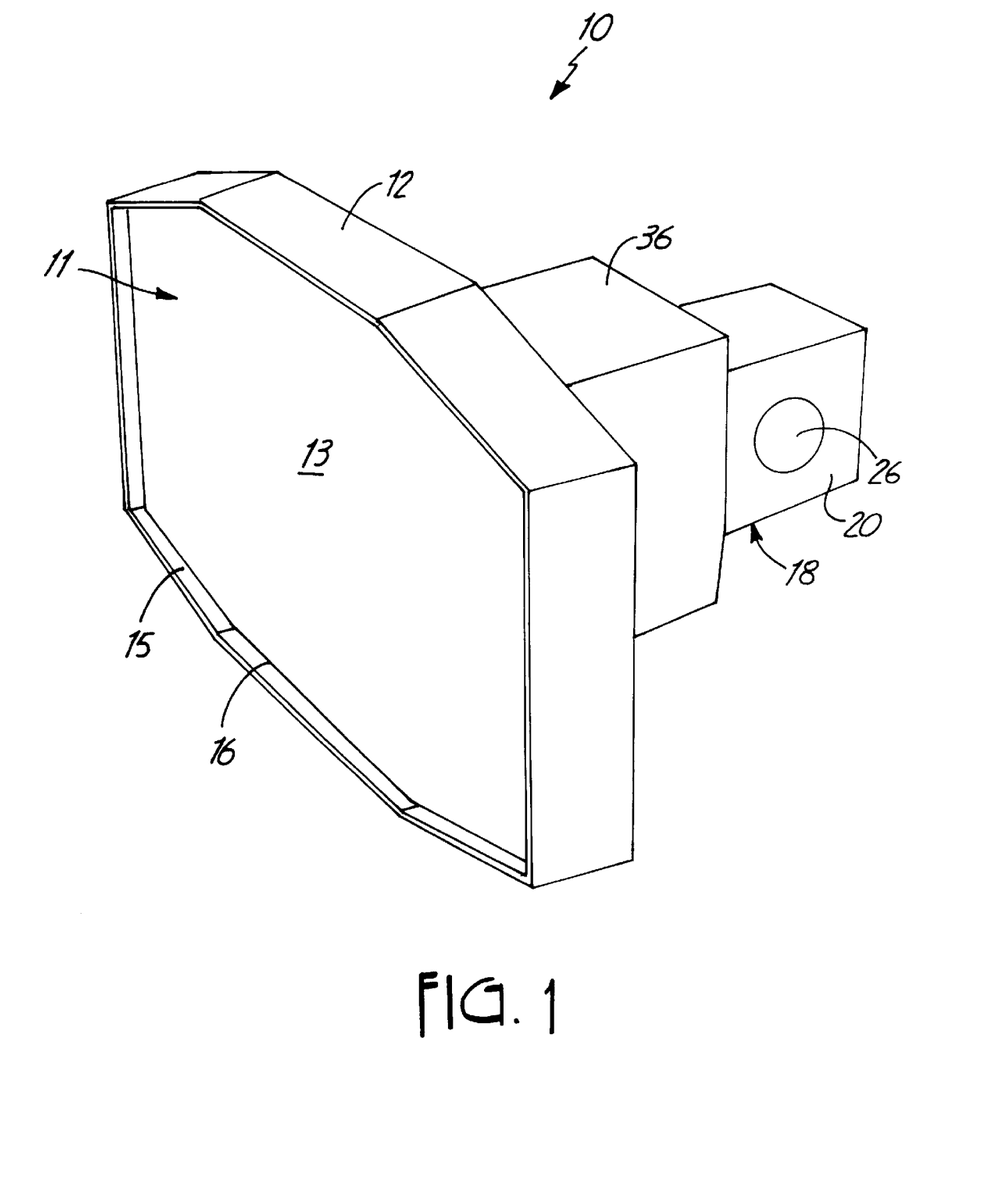
FIG. 1 is front perspective view of a convertible receiver hitch cover of the present invention (graphic element on front face not shown).
Figure 2:
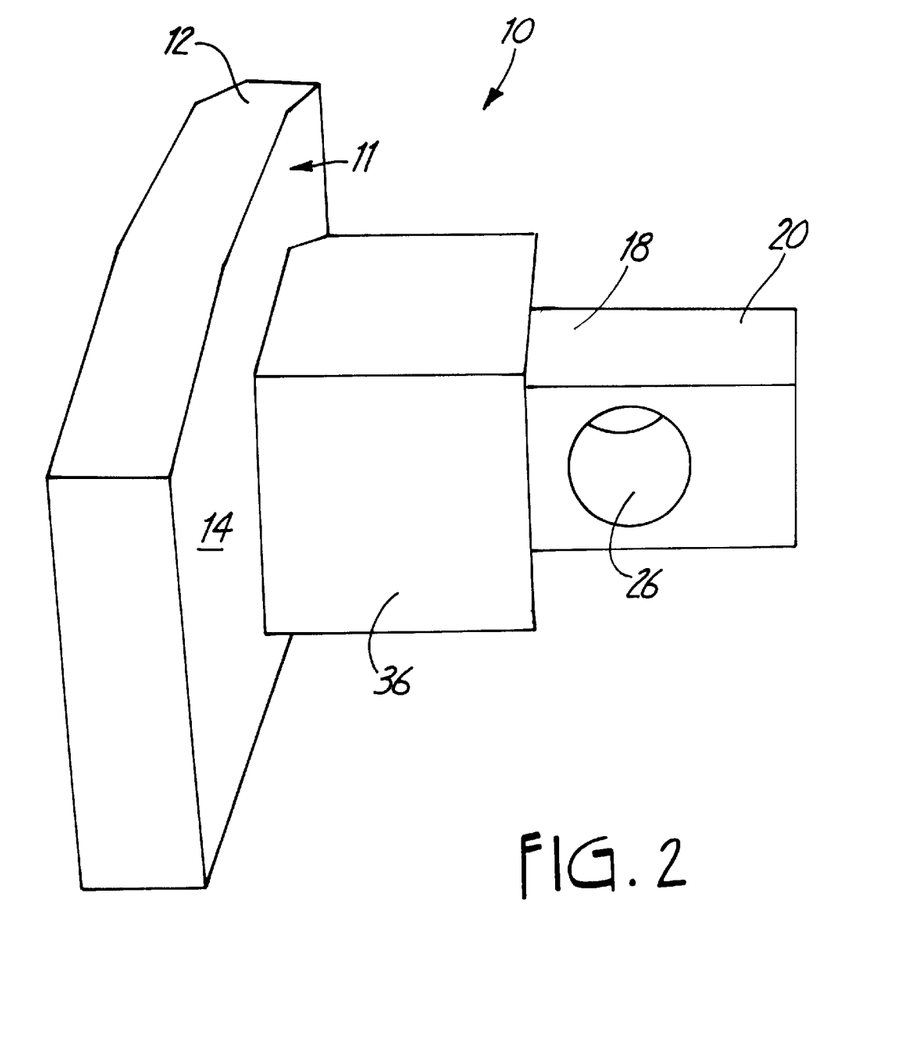
FIG. 2 is a rear perspective view of the convertible receiver hitch cover of FIG. 1.
Figure 3:
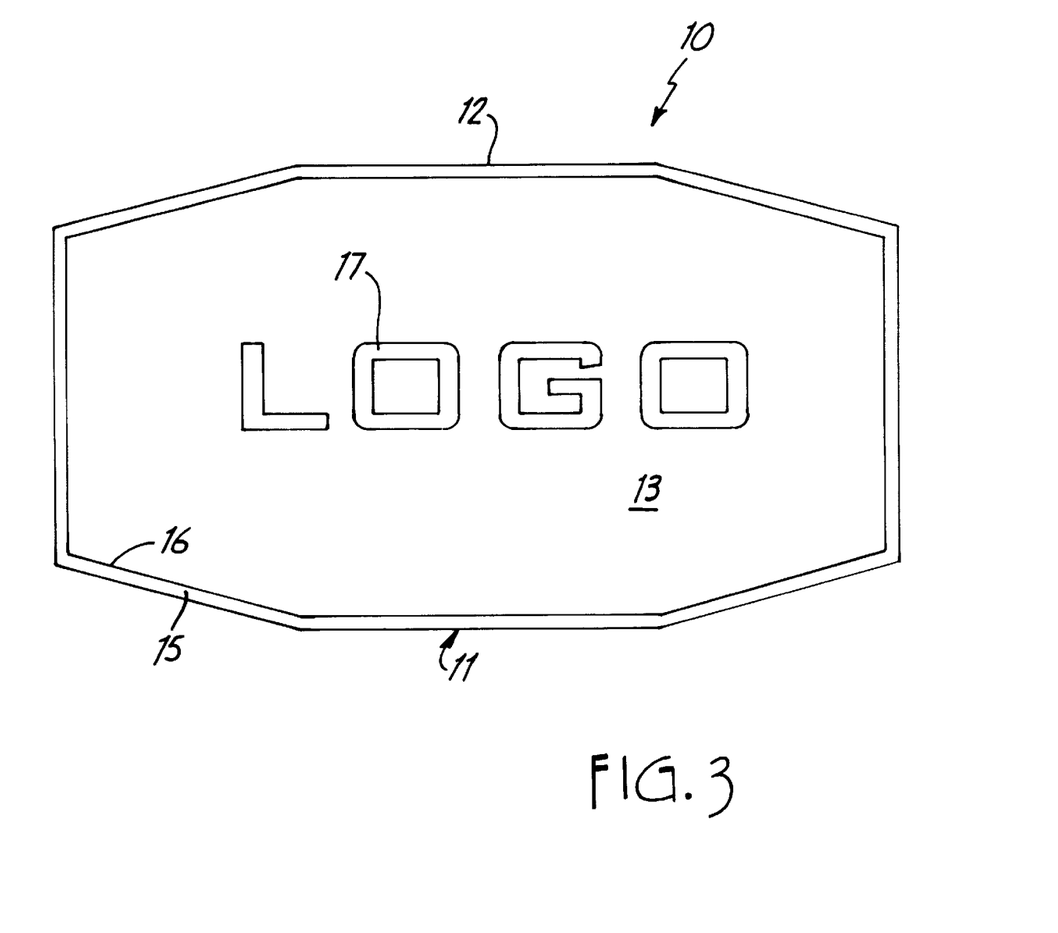
FIG. 3 is a front view of the convertible receiver hitch cover of FIG. 1.
Figure 4:
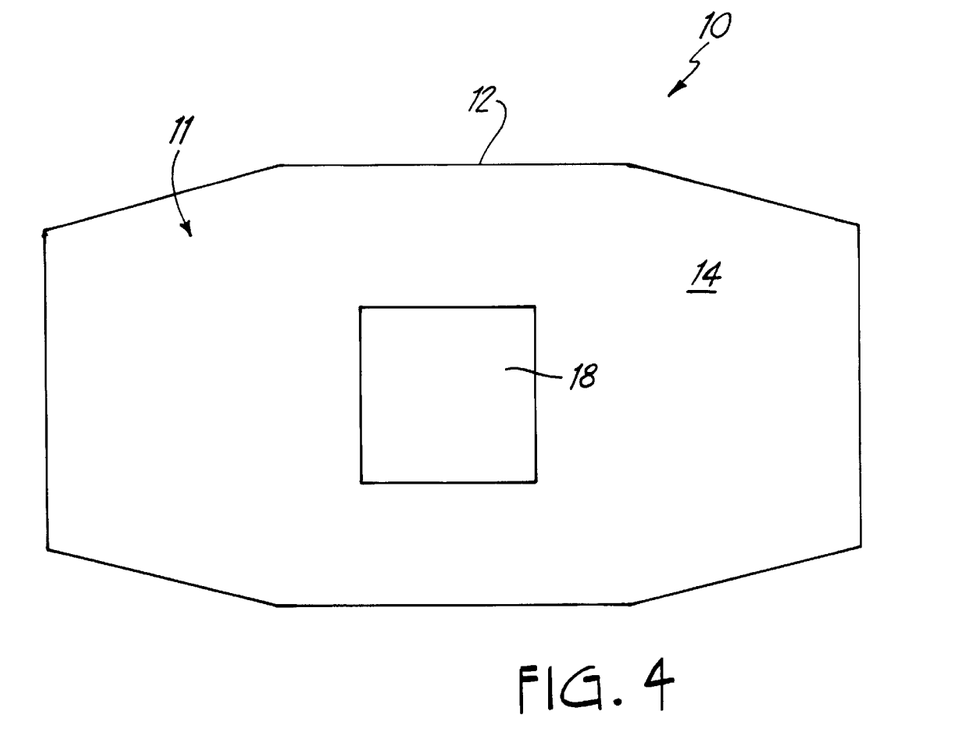
FIG. 4 is a rear view of the convertible receiver hitch cover of FIG. 1 without the spacer element being mounted on the cover shaft.

Lip 15 is positioned on front side 13 around periphery 12. Lip 15 and front side 13 define cavity 16. In a preferred embodiment, lip 15 is 1/8 inches wide and 1/8 inches high. Advantageously, graphic element 17 can be provided on front face 13 inside of cavity 16. For purposes of illustration, graphic element 17 is in the form of the alphanumeric characters "LOGO", but of course any kind of characters, images, information, data, or the like can be used in graphic element 17 as desired. A protective coating (not shown) can be placed over graphic element 17 in order to protect graphic element 17 from the elements.

Graphic element 17 can be applied onto front face 13 using any desired technique including screen printing, spraying, stenciling, painting, drawing, applying a decal, or the like. In a preferred embodiment, graphic element 17 is in the form of a self-adhesive, vinyl decal that is printed and die cut using a Roland Color Camm Pro PC 60 digital printer. The vinyl decal may be die cut from a variety of commercially available self-adhesive vinyl sheeting such as Avery calendered, reflective, adhesive-backed (pressure sensitive) films; 3M calendered, reflective, self-adhesive backed (pressure sensitive) films, Ritrama Duramark calendered and neon, adhesive-backed (pressure sensitive) films, or the like. When forming graphic element 17 from a decal, the decal is preferably slightly undersized relative to front face 13 to facilitate easy placement of decal. For example, the decal may be undersized so that there is about a 1/16 inch gap between the edge of the decal and lip 15.

In the practice of the present invention, a protective coating (not shown) is applied over graphic element 17. The protective coating is preferably formed from an optically clear, abrasion resistant, weather resistant, sun resistant, thermosetting polymer that undergoes no shrinkage, and preferably expands slightly, as it cures to form a solid protective barrier over graphic element 17. Because the polymer material undergoes no shrinkage, and preferably at least slightly expands as it cures, the polymer fills and interlocks with the microscopic voids in the underlying surfaces of cover 10 to mechanically help "lock" the coating onto the front face 13. This kind of mechanical interconnection is particularly beneficial for forming protective coatings onto metallic hitch covers, especially sandcast hitch covers formed from aluminum or ferrous alloys. In contrast, most conventional coating materials used as protective coatings over graphics tend to shrink as they cure. Such shrinkage prevents the coatings from mechanically interlocking with the microscopic voids of cover 10. When used on a receiver hitch cover, such shrinkage causes the resultant coating to show poor adhesion to the hitch cover, the graphic, or both. Delamination is often the result.

Preferably, the protective coating of the present invention is formed from a thermosetting polyurethane and/or epoxy polymer that undergoes no shrinkage or perhaps a slight expansion as it cures. A representative example of such a material is a polyurethane coating material commercially available from Environmental Technology, Inc. (ETI) under the designation EX78. This product is a two-part epoxy clearcoat including a resin component and a hardener component that are mixed just prior to coating. Once combined, the material hardens overnight. Another brand of two part epoxy that is believed to be suitable in the practice of the present invention is available under the WEST designation from the Gougeon Brothers.

To form the coating from the ETI two-part coating material, the components are mixed according to the manufacturer's specifications and then poured to fill the cavity in which graphic element is placed. Air bubbles in the poured material are driven out of the material by passing the flame of a propane torch about seven inches above the surface of the material. This action drives air bubbles out of the poured material almost instantly. The effect can be visually observed. The same effect is achieved by blowing carbon dioxide, e.g., by exhaling over the surface. Indeed, while not wishing to be bound by theory, it is believed that the act of passing the flame of the propone torch above the coating surface works mainly by subjecting the surface of the coating to a carbon dioxide treatment. Whatever the mechanism at play, the air bubbles are quickly driven out and the resultant surface is very smooth. The hitch cover is set in a dust-free environment to allow the coating to cure.

The resultant coating provides excellent protection for graphic element 17. Samples were subjected to temperature testing in which the sample hitch cover was successively placed into the sun during the day, and then in a freezer overnight for at least five weeks. No expansion or contraction was visually observed, and no delamination occurred. Samples were also submerged in water and salt water, respectively, for about two days. No effects were observed, except that the unprotected aluminum alloy surfaces were slightly discolored after salt water testing. Another sample was left outdoors exposed to the sun and elements for over a month. No changes were observed.

Shaft 18 extends from the backside 14 of faceplate 11. Shaft 18 includes first end 19 proximal to faceplate 11 and second end 20 distal from faceplate 11. Shaft 18 as shown has a square cross section of about 1.25 inches×about 1.25 inches to fit inside Class II industry standard receiver tube 23 (see FIGS. 8 and 9, which show Class II tube 23) having a square bore 24 also having a cross section of about 1.25 inches×about 1.25 inches. Shaft 18 includes a through bore 26 that cooperates with apertures 28 in receiver tube 23 so that cover 10 can be secured to tube 23 by a suitable fastener such as bolt 30 and nut 32.

Figure 5:
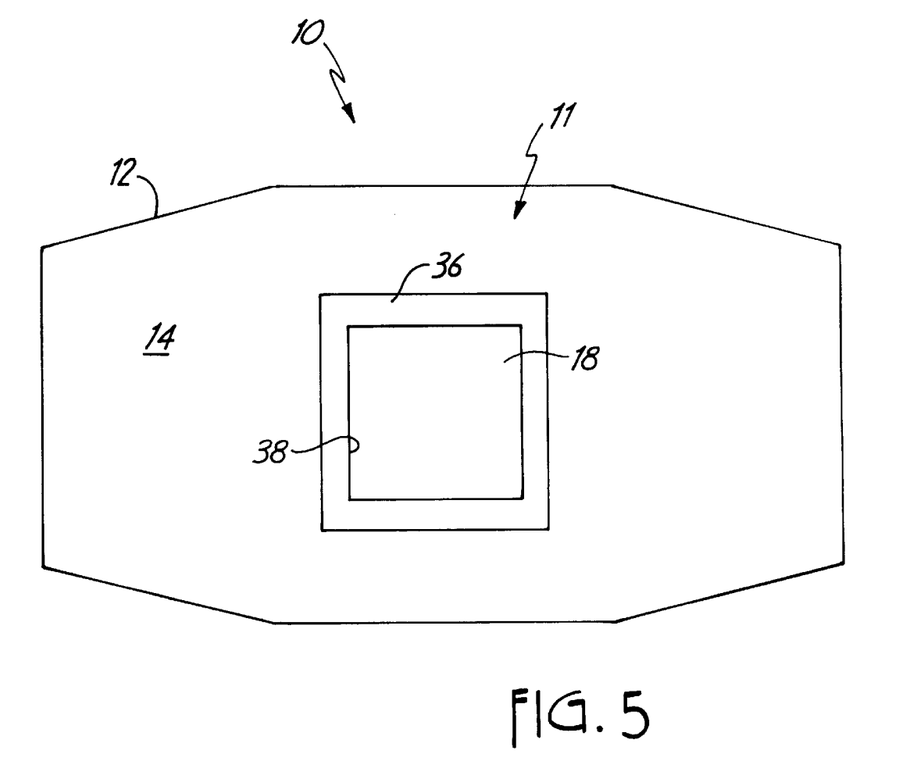
FIG. 5 is a rear view of the convertible receiver hitch cover of FIG. 1 with the spacer element being mounted on the cover shaft.
Figure 6:
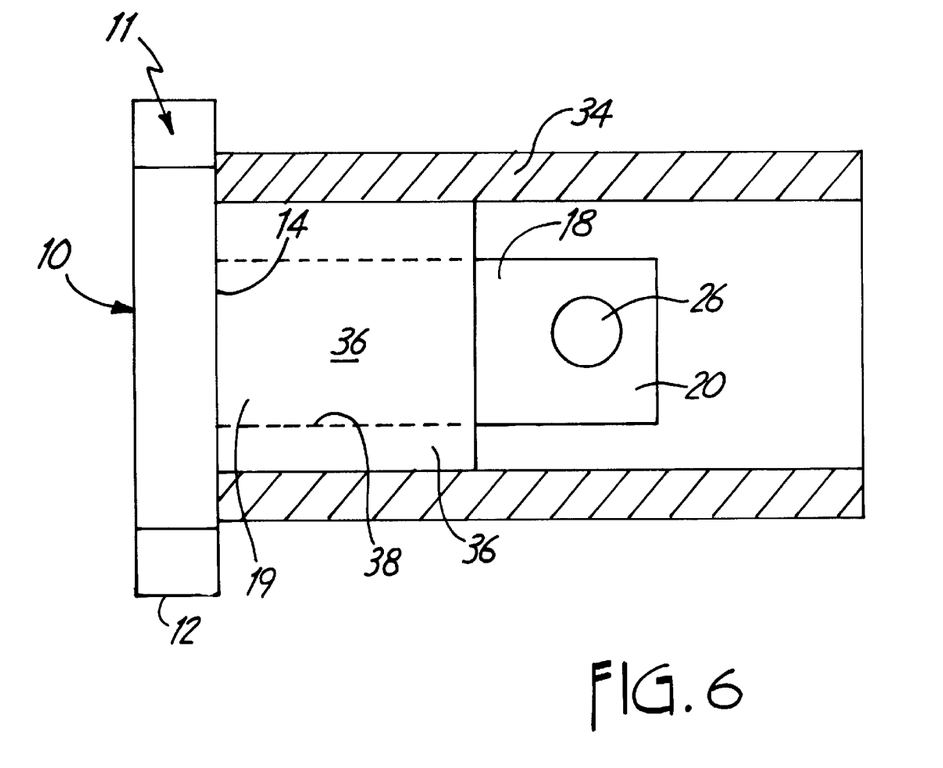
FIG. 6 is a side view of the convertible receiver hitch cover of FIG. 1 inserted into a Class III receiver hitch tube, wherein the tube is shown in cross section.
Figure 7:
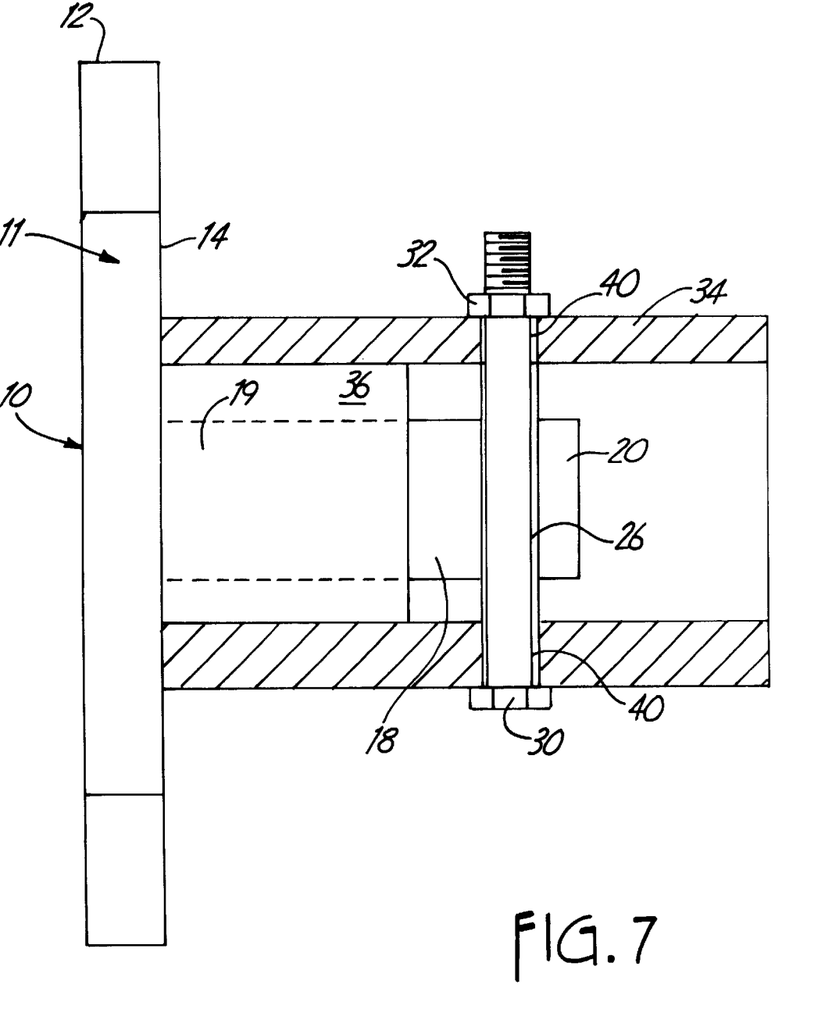
FIG. 7 is a top view of the convertible receiver hitch cover of FIG. 1 inserted into a Class III receiver hitch tube and secured in place with a bolt, wherein the tube is shown in cross section.
Figure 8:
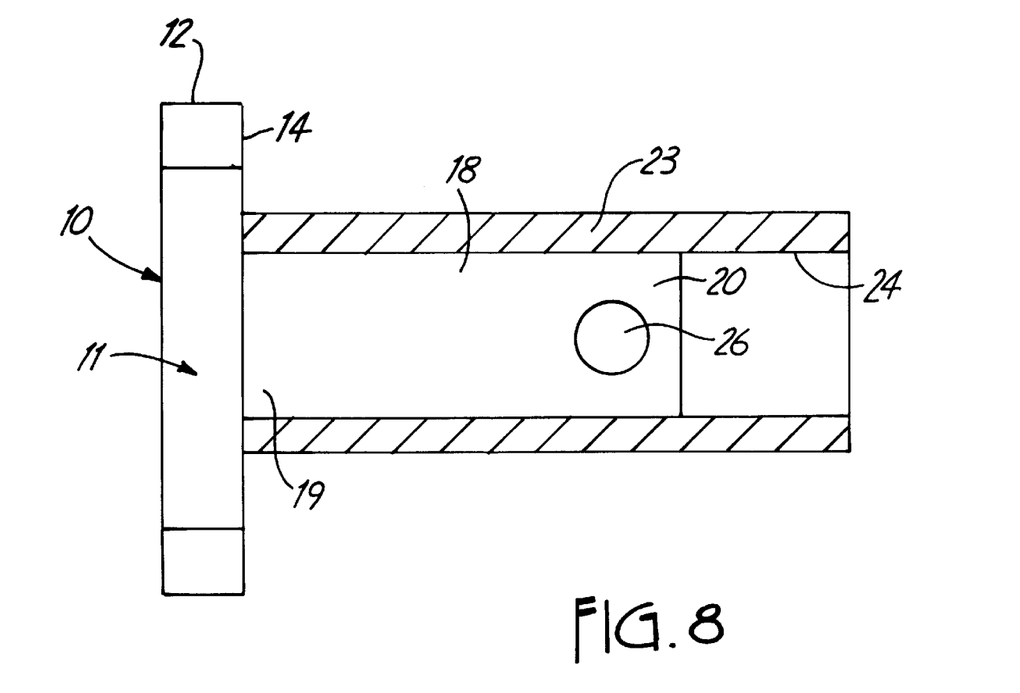
FIG. 8 is a side view of the receiver hitch tube of FIG. 1 inserted into a Class III receiver hitch tube, wherein the tube is shown in cross section.
Figure 9:
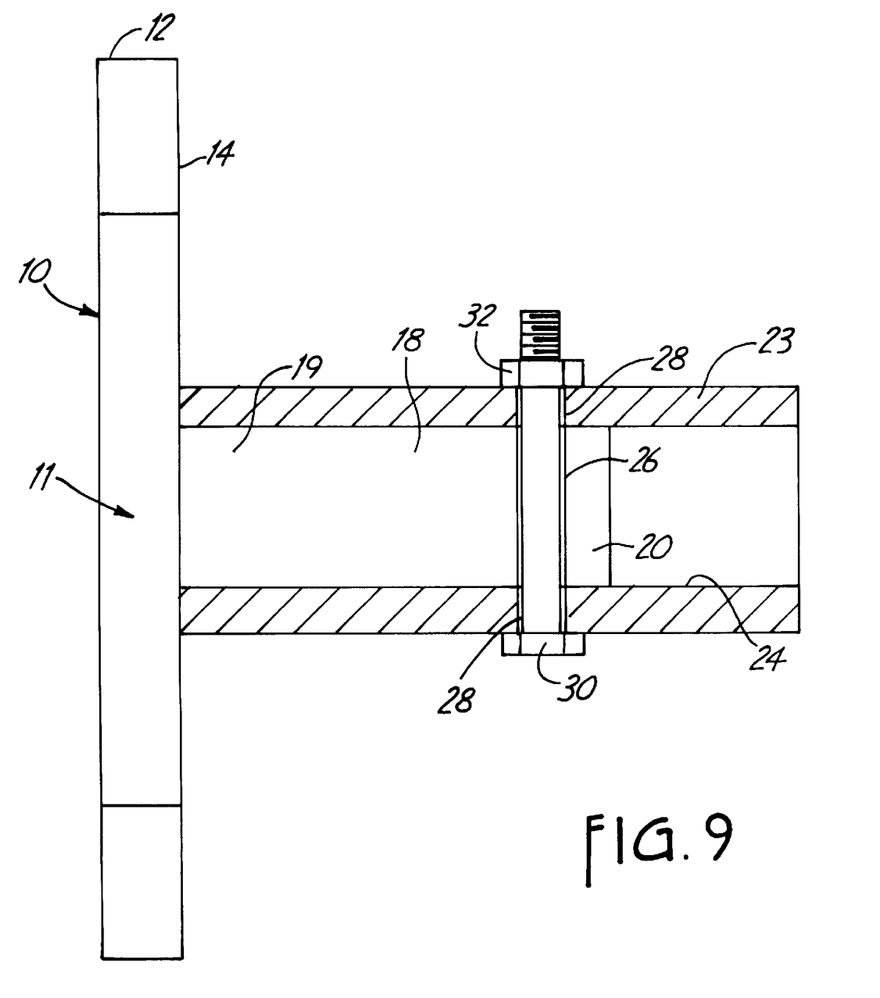
FIG. 9 is a top view of the convertible receiver hitch cover of FIG. 1 inserted into a Class II receiver hitch tube and secured in place with a bolt, wherein the tube is shown in cross section.

Cover 10 becomes convertible to fit larger, Class III industry standard receiver tube 34 (the Class III tube 34 is shown in FIGS. 6 and 7) having a square cross-section of about 2 inches×2 inches when removable sleeve or spacer element 36 is slid over shaft 18. Spacer element 36 has a through bore 38 having a square cross-section of about 1.25 inches×about 1.25 inches to fit snugly over shaft 18 and an outside, square cross-section of about 2 inches by about 2 inches to fit snugly inside receiver tube 34. In a preferred position, sleeve or spacer element 36 is positioned all the way onto shaft 18 so that sleeve or spacer element 36 is positioned proximal to faceplate 11. As was the case with the smaller industry standard receiver tube 23, larger receiver tube 34 also includes apertures 40 that cooperate with bore 26 so that cover 10 can be secured to tube 34 by a suitable fastener such as bolt 30 and nut 32.

Spacer element 36 can be made from a wide range of suitable materials, including metals, metal alloys, polymers, wood, ceramic, and the like. In a particularly preferred embodiment, spacer element is cut from a length of a rubber extrusion having the desired cross-section. One example of such an extruded rubber product is a commercial grade EPDM rubber commercially available from Lakeview Industries under the trade designation 72129E600 and having a hardness of 60 durometer. In another embodiment, spacer element may be formed from a resilient, low friction polymeric material including a polyolefin such as ultra high molecular weight polyethylene, a fluoropolymer such as polytetrafluoroethylene, or the like.

In the preferred embodiment of cover 10 as shown, faceplate 11, shaft 18, and lip 15 are formed as a single unitary piece. Of course, this is not essential, and two or more of these parts could be formed separately from each other and then coupled to each other by glue, welding, bolts, screws, rivets, snap fit engagement, or the like. Faceplate 11, shaft 18, and lip 15 can be formed from a wide variety of materials, including metals, metal alloys, polymers, wood, ceramic, and the like. In preferred embodiments, cover 10 is desirably formed from a casting of an aluminum alloy. In alternative preferred embodiments, cover 10 could also be molded as a single unitary piece from a suitable polymer or combination of polymers.

What is claimed is:

1. A convertible receiver hitch cover that fits at least first and second receiver tubes having respective first and second bores of respective first and second cross-sections, comprising:

(a) a faceplate having a periphery, a front face and a backside;

(b) a shaft extending from the backside of the faceplate, wherein the shaft has a first end proximal to the faceplate and a second end distal from the faceplate, said shaft being sized to fit inside the first bore of the first receiver tube; and (c) a removable sleeve selectively fitting over the shaft, said sleeve being sized to fit inside the second bore of the second receiver tube.

2. The convertible receiver hitch cover of claim 1, further comprising a lip on the front side of the faceplate, said lip and front face defining a cavity.

3. The convertible receiver hitch cover of claim 1, further comprising a graphic element provided on the front face of the faceplate.

4. The convertible receiver hitch cover of claim 3, wherein the graphic element is a self-adhesive decal.

5. The convertible receiver hitch cover of claim 3, further comprising a protective, polymeric hard coat provided over the graphic element.

6. The convertible receiver hitch cover of claim 1, wherein the sleeve is positioned over the shaft proximal to the faceplate, and wherein the distal end of the shaft comprises a through hole positioned to cooperate with apertures of the first and second receiver tubes when the hitch cover is inserted into a receiver hitch tube so that the cover can be secured to the tube by a fastening device that engages the through hole and the apertures.

* * * * *